(12) United States Patent
Noll et al.

(10) Patent No.: US 6,598,988 B1
(45) Date of Patent: Jul. 29, 2003

(54) DISPLAY INSTRUMENT, IN PARTICULAR IN A MOTOR VEHICLE

(75) Inventors: Heinrich Noll, Gross-Umstadt (DE); Matthias Rein, Rossdorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/889,842

(22) PCT Filed: Nov. 22, 2000

(86) PCT No.: PCT/EP00/11608

§ 371 (c)(1),
(2), (4) Date: Oct. 18, 2001

(87) PCT Pub. No.: WO01/38120

PCT Pub. Date: May 31, 2001

(51) Int. Cl.[7] .............................................. G01D 11/28
(52) U.S. Cl. .............................. 362/26; 362/23; 362/28; 362/555; 116/284
(58) Field of Search .................... 362/489, 23, 27, 362/28, 555, 26; 116/288, 284, 285, 286, 287

(56) References Cited

U.S. PATENT DOCUMENTS 5,603,283 A * 2/1997 Owen .......................... 116/284

6,379,015 B2 * 4/2002 Wilhelm et al. .............. 362/23

FOREIGN PATENT DOCUMENTS

| DE | 9420813 | 4/1995 | |
|---|---|---|---|
| EP | 0679871 A1 * | 2/1995 | ........... G01D/11/28 |
| EP | 0679871 | 11/1995 | |

OTHER PUBLICATIONS

Patent Abstracts of Japan vol. 1997, No. 08, Aug. 29, 1997 & JP 09 101182 A (Shinwa Denshi Device Hanbai KK; Okuno Toshinori Apr. 15, 1997.

Patent Abstracts of Japan vol. 1996, No. 03, Mar. 29, 1996 & JP 07 29429 3 A (Nippon Seiki Co Ltd), Nov. 10, 1995.

* cited by examiner

Primary Examiner—Sandra O'Shea
Assistant Examiner—Ali Alavi
(74) Attorney, Agent, or Firm—Martin A. Farber

(57) ABSTRACT

In a pointer instrument, a LED (7) is arranged in such a way that light can pass from it into a free end face (5) of a pointer shaft (2) which is embodied as a light guide. For this purpose, a printed circuit board (4) on which the LED (7) is fitted has an opening (6) which is flush with the end face (5) of the pointer shaft (2) and into which the LED (7) projects, at least partially.

11 Claims, 2 Drawing Sheets

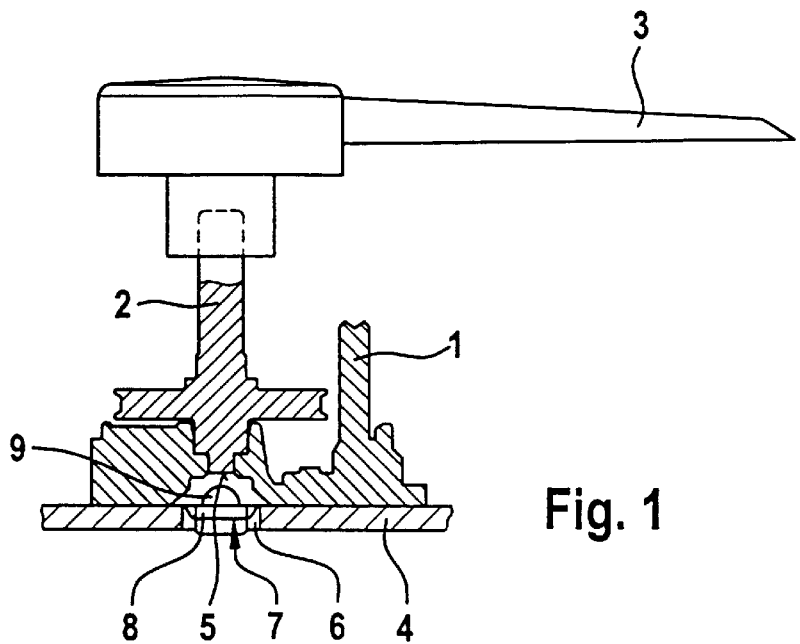
Fig. 1
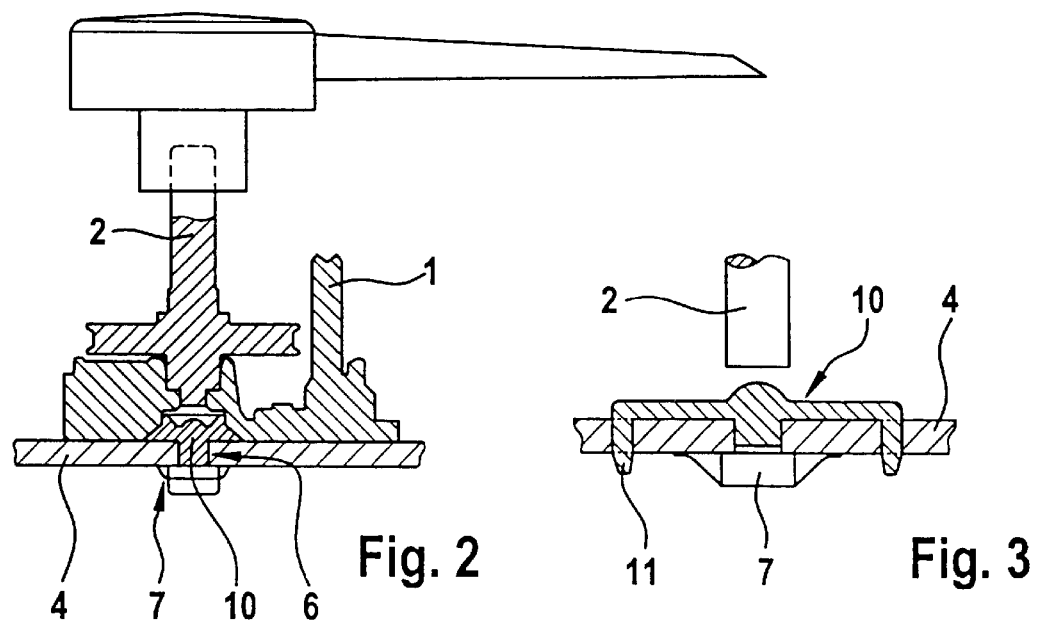
Fig. 2
Fig. 3
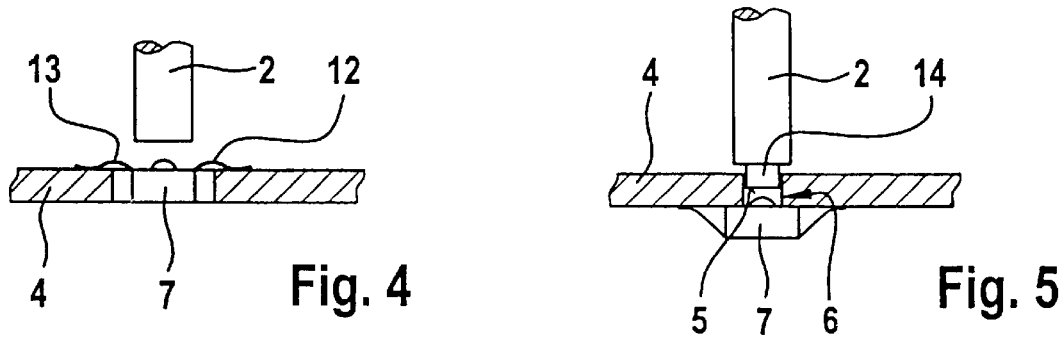
Fig. 4
Fig. 5

DISPLAY INSTRUMENT, IN PARTICULAR IN A MOTOR VEHICLE

FIELD AND BACKGROUND OF THE INVENTION

The invention relates to a display instrument, in particular in a motor vehicle, which display instrument has a light-guiding pointer which is connected fixed in terms of rotation to a pointer shaft embodied as a light guide, and a LED which is secured behind the end face of the pointer shaft facing away from the pointer in order to inject light into the pointer shaft, and thus also into the pointer from a printed circuit board arranged behind a pointer drive.

Display instruments of the abovementioned type are known. In them the LED is arranged on the side of the printed circuit board facing the pointer shaft, opposite the lower end face of the pointer shaft. For this reason, the light which is emitted by the LED only needs to be injected once into the pointer shaft and deflected once in order to make it pass into the radially orientated pointer. However, in practise the arrangement of an LED on the side of the printed circuit board facing the pointer drive often causes problems because the spatial conditions are very restricted in this region. The problem is aggravated by the fact that LEDs with strong illumination which are necessary to light a pointer brightly have a particularly large overall volume.

SUMMARY OF THE INVENTION

The invention is based on the problem of configuring a display instrument of the type mentioned at the beginning which is intended for a motor vehicle in such a way that the space required for the arrangement of the LED is as small as possible.

This problem is achieved according to the invention in that the printed circuit board has an opening opposite the end face of the pointer shaft, and the LED projects into this opening.

As a result of this configuration, the cross section of the printed circuit board can be at least partially used to receive the LED, with the result that the LED does not need to project as far, or does not need to project at all, into the pointer drive, and takes up less space there. In order to simplify the orientation of the LED, it is favorable if the opening is arranged flush with the end face of the printed circuit board.

The fabrication of the display instrument is particularly cost effective if the LED is electrically connected to the printed circuit board on the side of said printed circuit board facing away from the pointer drive and projects with a lens into the opening the electrical connection of such a LED can be made by customary soldering.

The space required for the LED is particularly small if the LED is electrically connected to the printed circuit board on the side of the printed circuit board facing the pointer drive and projects with its base into the opening.

The light can be injected into the pointer shaft in a particularly low-loss fashion if, in accordance with a further advantageous development of the invention, the LED is arranged on the side of the printed circuit board facing away from the pointer drive and a lens of the LED which is embodied as a separate component, receives the light from the LED and injects it into the pointer shaft is inserted into the opening.

The lens can be secured particularly tightly to the printed circuit board and mounted very quickly by pressing or clipping on if it has a circumferential securing edge which can be pressed or clipped onto the printed circuit board.

The pointer may be illuminated with a color different from that of the LED if the lens has a coloring. Alternatively, it would be possible to conceive of using a comparatively expensive multi-color LED for changing illumination colors.

If the LED is arranged on the side of the printed circuit board facing away from the pointer drive and projects into the opening, it is then possible, in order to avoid light losses, to keep the distance between the injection face of the pointer shaft and the LED very small by virtue of the fact that the pointer shaft engages partially in the opening in the printed circuit board.

A development of the invention which is advantageous in particular in LEDs with strong illumination provides for the LED to have an element which conducts away heat. This element which conducts away heat is, in a particularly simple form, a housing of the LED which, for example, is made particularly large for this purpose. However, special elements for conducting away heat, such as cooling ribs, may also be provided.

According to another advantageous development of the invention, a reflector is arranged so as to engage in the opening in the printed circuit board, which reflector increases the usable proportion of the light of the LED which can be injected into the pointer shaft. In a particularly simple way it is possible for this reflector to be plugged or pressed into the printed circuit board or clipped to the printed circuit board.

The number of components of such a display instrument according to the invention can be advantageously reduced if, in accordance with another refinement of the invention, the reflector has an electrical conducting element for making contact with the LED.

BRIEF DESCRIPTION OF THE DRAWINGS

The invention permits various embodiments. In order to clarify its basic principle further, a plurality thereof are illustrated in the drawing and will be described below. In the drawing:

DETAILED DESCRIPTION OF THE PREFERRED EMBODIMENT

Figure 6:
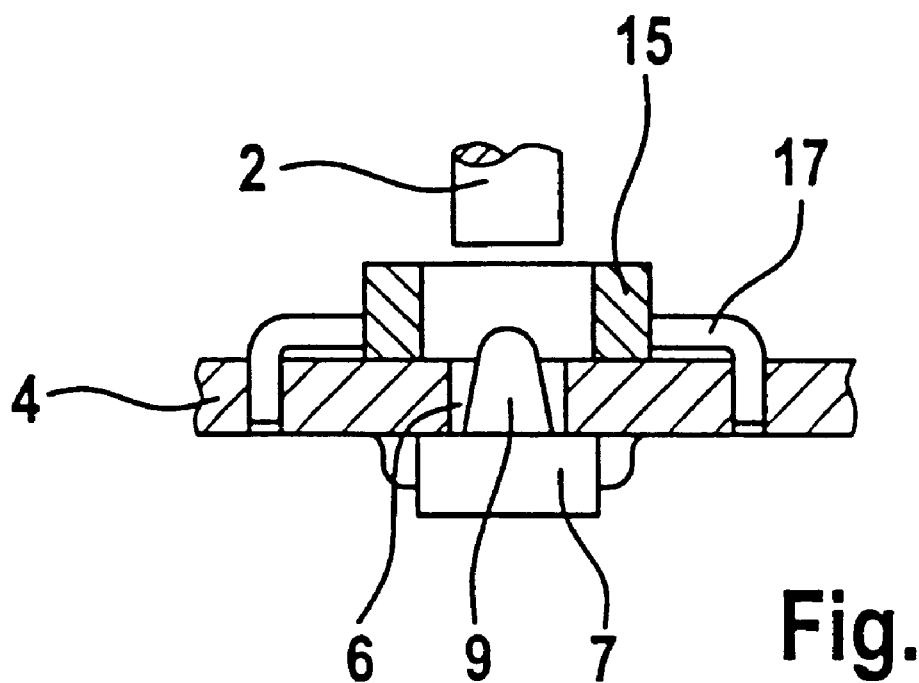
Figure 7:
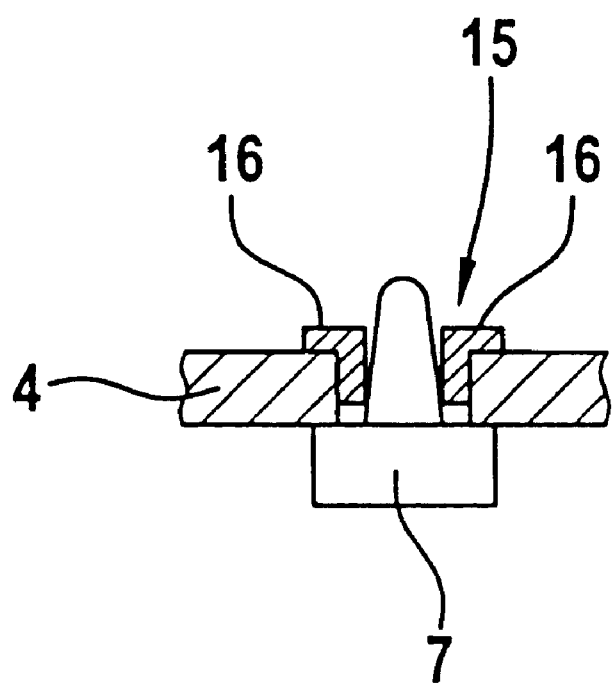

FIG. 1 shows a vertical section through a region of a display instrument according to the invention, FIG. 2 shows a vertical section, corresponding to FIG. 1, through a second embodiment of the display instrument, FIG. 3 shows a section through the region of a printed circuit board with an LED and one end of a pointer shaft, FIG. 4 shows a section, corresponding to FIG. 3, through a modified embodiment, FIG. 5 shows a section, corresponding to FIG. 3, through a further embodiment, FIG. 6 shows a section, corresponding to FIG. 3, through a further embodiment with a reflector, and FIG. 7 shows an alternative embodiment with a reflector according to FIG. 6.

FIG. 1 shows a region of a pointer drive 1 of a display instrument (not illustrated in more detail), for example a tachometer, of a motor vehicle, in which pointer drive 1 a pointer shaft 2 made of light-guiding material is mounted. This pointer shaft 2 is fitted with a pointer 3 which is also light guiding. On the side of the pointer drive 1 facing away from the pointer 3, a printed circuit board 4 is arranged, said printed circuit board 4 having an opening 6 flush with the lower end face 5 of the pointer shaft 2. A LED 7 projects with its base 8 into this opening 6 from the side of the pointer drive 1, with the result that only a lens 9 of the LED 7 projects out of the plane of the printed circuit board 4. The LED 7 is advantageously operated with a current of approximately 50 mA (order of magnitude) and preferably has in this example an irradiation angle of approximately 10° on each side of its center axis.

In the embodiment according to FIG. 2, the LED 7 is arranged on the side of the printed circuit board 4 facing away from the pointer drive 1 and soldered to it there. A separate lens 10 is inserted into the opening 6 from the side of the pointer shaft 2, which lens 10 is seated on the printed circuit board 4 and injects the light from the LED 7 into the pointer shaft 2.

As is shown by FIG. 3, the separate lens 10 may have a circumferential securing edge 11 which is pressed or clipped into the printed circuit board 4 with the result that the lens 10 is secured particularly tightly to the printed circuit board 4.

FIG. 4 shows that the LED 7 is seated on the printed circuit board 4 from above with conductors 12, 13.

FIG. 5 shows that the pointer shaft 2 can project with a shoulder 14 into the printed circuit board 4 with the result that its lower end face 5 is particularly near to the LED 7.

FIG. 6 shows the LED 7 arranged on the side of the printed circuit board 4 facing away from the pointer drive (not illustrated here), the lens 9 projecting into the opening 7 in the printed circuit board 4. A reflector 15 with securing arms 17 being pressed into the printed circuit board 4 and causing the light emitted by the LED 7 to converge before it enters the pointer shaft 2.

FIG. 7 shows how the reflector 15 can be formed by means of through-contacts 16 for making electrical contact with the LED 7 through the printed circuit board 4.

We claim:

1. A display instrument, in particular in a motor vehicle, which display instrument has a light-guiding pointer which is connected fixed in rotation to a pointer shaft embodied as a light guide, and a LED which is secured behind an end face of the pointer shaft facing away from the pointer in order to inject light into the pointer shaft, and thus also into the pointer from a printed circuit board arranged behind a pointer drive, wherein the printed circuit board (4) has an opening (6) opposite the end face (5) of the pointer shaft (2), and the LED (7) projects into said opening (6).

2. The display instrument as claimed in claim 1, wherein the LED (7) is electrically connected to the printed circuit board (4) on a side of said printed circuit (4) facing away from the pointer drive (1) and projects with a lens (9) into the opening (6).

3. A display instrument, in particular in a motor vehicle, which display instrument has a light-guiding pointer which is connected fixed in rotation to a pointer shaft embodied as a light guide, and a LED which is secured behind an end face of the pointer shaft facing away from the pointer in order to inject light into the pointer shaft, and thus also into the pointer from a printed circuit board arranged behind a pointer drive, wherein the printed circuit board (4) has an opening (6) opposite the end face (5) of the pointer shaft (2), and the LED (7) projects into said opening (6), wherein the LED (7) is electrically connected to the printed circuit board (4) on a side of the printed circuit board (4) facing the pointer drive (1) and projects with a base (8) thereof into the opening (6).

4. A display instrument, in particular in a motor vehicle, which display instrument has a light-guiding pointer which is connected fixed in rotation to a pointer shaft embodied as a light guide, and a LED which is secured behind an end face of the pointer shaft facing away from the pointer in order to inject light into the pointer shaft, and thus also into the pointer from a printed circuit board arranged behind a pointer drive, wherein the printed circuit board (4) has an opening (6) opposite the end face (5) of the pointer shaft (2), and the LED (7) projects into said opening (6), wherein the LED (7) is arranged on a side of the printed circuit board (4) facing away from the pointer drive (1) and a lens (10) of the LED (7), is inserted in the opening (6) said lens being formed as a separate component, receives light from the LED (7) and injects it into the pointer shaft (2).

5. The display instrument as claimed in claim 4, wherein the lens (10) has a circumferential securing edge (11) which can be pressed or clipped onto the printed circuit board (4).

6. The display instrument as claimed in 2, wherein the lens has a coloring.

7. A display instrument, in particular in a motor vehicle, which display instrument has a light-guiding pointer which is connected fixed in rotation to a pointer shaft embodied as a light guide, and a LED which is secured behind an end face of the pointer shaft facing away from the pointer in order to inject light into the pointer shaft, and thus also into the pointer from a printed circuit board arranged behind a pointer drive, wherein the printed circuit board (4) has an opening (6) opposite the end face (5) of the pointer shaft (2), and the LED (7) projects into said opening (6), wherein the pointer shaft (2) engages partially into the opening (6) of the printed circuit board (4).

8. A display instrument, in particular in a motor vehicle, which display instrument has a light-guiding pointer which is connected fixed in rotation to a pointer shaft embodied as a light guide, and a LED which is secured behind an end face of the pointer shaft facing away from the pointer in order to inject light into the pointer shaft, and thus also into the pointer from a printed circuit board arranged behind a pointer drive, wherein the printed circuit board (4) has an opening (6) opposite the end face (5) of the pointer shaft (2), and the LED (7) projects into said opening (6), wherein the LED (7) has an element for conducting away heat.

9. A display instrument, in particular in a motor vehicle, which display instrument has a light-guiding pointer which is connected fixed in rotation to a pointer shaft embodied as a light guide, and a LED which is secured behind an end face of the pointer shaft facing away from the pointer in order to inject light into the pointer shaft, and thus also into the pointer from a printed circuit board arranged behind a pointer drive, wherein the printed circuit board (4) has an opening (6) opposite the end face (5) of the pointer shaft (2), and the LED (7) projects into said opening (6) and further comprising a reflector (15) arranged so as to engage in the opening (6) of the printed circuit board (4).

10. The display instrument as claimed in claim 9, wherein the reflector (15) has an electrical conductor element (16) for making contact with the LED (7).

11. The display instrument as claimed in 4, wherein the lens has a coloring.

* * * * *